G. AND F. H. WHOMES.
METAL FACED AUTOMOBILE CURTAIN LIGHT.
APPLICATION FILED OCT. 27, 1920.
1,427,250.
Patented Aug. 29, 1922.
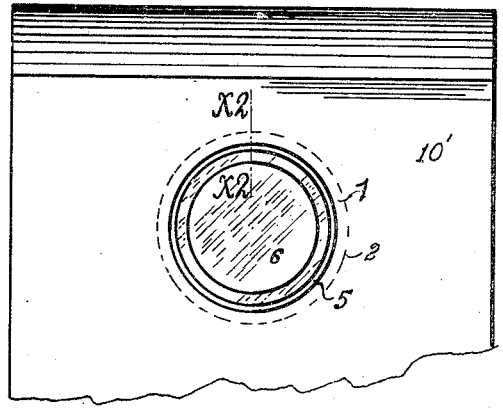
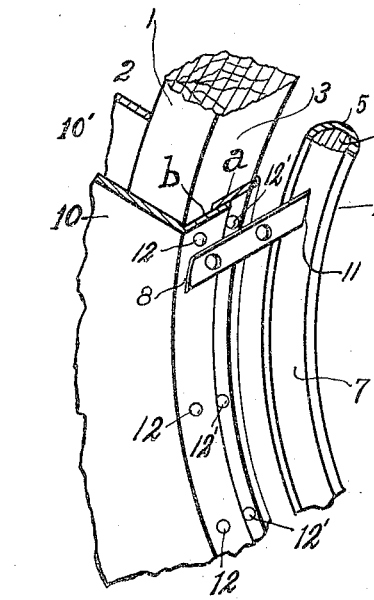
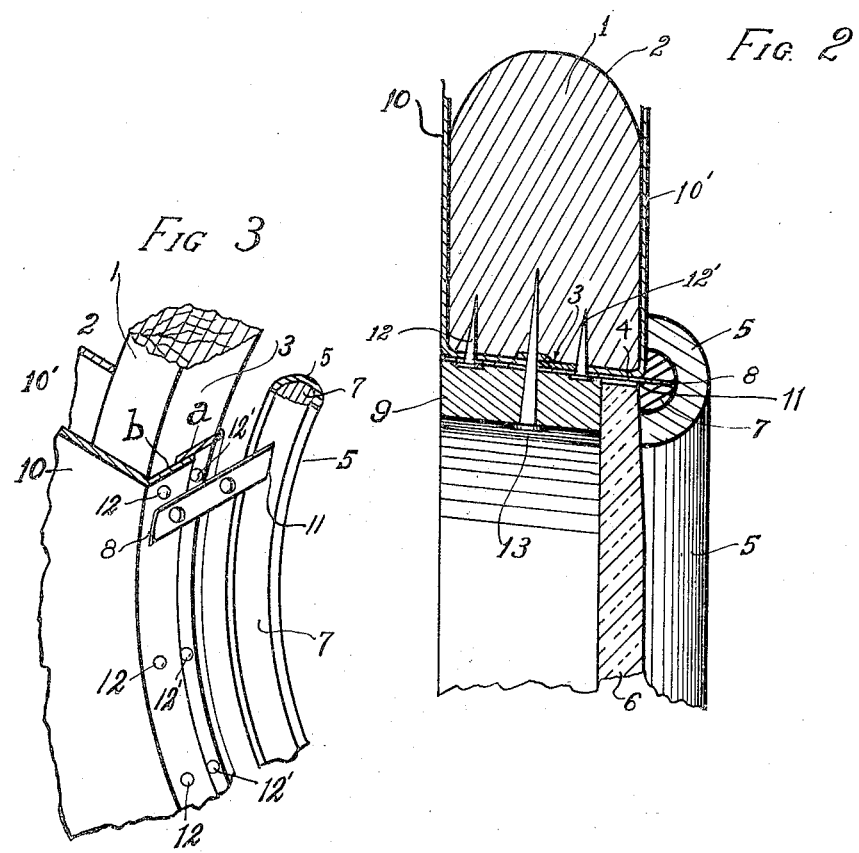
WITNESS
Marcos Alvarado
INVENTORS
GEORGE WHOMES
FRANCIS H. WHOMES
James R. Townsend
their atty

UNITED STATES PATENT OFFICE.

GEORGE WHOMES AND FRANCIS H. WHOMES, OF LOS ANGELES, CALIFORNIA.

METAL-FACED AUTOMOBILE CURTAIN LIGHT.

1,427,250. Specification of Letters Patent. Patented Aug. 29, 1922.

Application filed October 27, 1920. Serial No. 419,893.

*To all whom it may concern:*

Be it known that we, GEORGE WHOMES and FRANCIS H. WHOMES, citizens of the United States, residing at Los Angeles, in the county of Los Angeles and State of California, have invented a new and useful Metal-Faced Automobile Curtain Light, of which the following is a specification.

An object of this invention is to provide an automobile light construction for flexible curtains or walls of an automobile cover, which will be ornamental, will be safe from becoming loose or separated, will be water tight, and will hold the glass pane firmly without danger of breaking.

A feature of the invention is the arrangement of a hollow half-round metal finish fixed to the outside of the curtain and held in firm engagement with the curtain and the pane, and holding the pane firmly in place within the frame to which the curtain is attached, said finish being held in place by metal straps or lugs fixed to the metal and wooden frames.

An advantage of this construction is the provision thereby of means for holding a concealed gasket tightly in place and to provide for easy disassembling of the parts.

The invention broadly includes in combination with a frame and a pane seated in said frame, of a hollow half-round metal ring provided with stays or lugs fixed in the cavity of said ring and extending across the edge of the pane and into the inside of the frame to which it is secured, there being a sufficient number of such stays to hold the ring firmly in place, an accommodation for a backing or gasket being thus provided inside the ring, and provision being made whereby the gasket is held firmly in place against the pane and the curtain on the frame.

The frame and ring are so conformable to each other as to clamp the outer curtain between them, and may be of any practical shape. Round frames and rings are preferred and the drawings will be drawn accordingly.

Other objects, advantages and features of invention may appear from the accompanying drawing, the subjoined detail description and the appended claims.

The accompanying drawing illustrates the invention.

Figure 1 is a fragmental elevation on small scale of the exterior of a curtain with the window in place.

Fig. 2 is a fragmental section on line $x^2$ Fig. 1, on greatly enlarged scale.

Fig. 3 is a fragmental detail of detached parts.

The circular wooden frame 1 is hoop-like in form having an orifice $c$ and an inside diameter of 8 inches more or less. The outside edge 2 of the frame 1 is rounded while the inside edge 3 forms a transversely straight tapering face, the smaller diameter 4 of which is at the outer side of the curtain. 5 is a hollow half round metal finish ring; the concavity of which is adapted to extend over the joint between the frame 1 and the pane 6 which is shown as made of bevel edged plate glass. 7 is a compressible water tight washer or gasket that is preferably made of rubber.

At various points, preferably four or more in number around the frame, sheet metal lugs or stays 8 are soldered to the metal ring 5 at the center of its groove. Said lugs or stays are long enough to extend through and beyond the opposite side of the frame. A welt 9 is provided to hold the glass firmly against the pressure of the rubber washer 7 and metal ring 5, and to give a finish to the inside edge of the window.

In practice the inner and outer linings 10, 10' of the curtain are cut for the purpose in a well known manner and thus provided with an orifice to accommodate the glass; the curtain at the margin of the orifice forming laps $a$, $b$ to fold upon the inside of the frame. These laps are stretched across the inner face of the frame from the opposite sides and are held fast with cement, one lining lapping somewhat over the other. The rubber washer 7 is provided with slits 11 cut to accommodate the lugs 8, and said washer is fitted into the cavity of the ring with the lugs 8 extending through said slits so as to be fastened to the frame. Said lugs are secured to the frame by tacks 12, 12' driven therethrough and through the laps. Before the tacks 12, 12' are driven, the lugs are drawn tightly into position to compress the washer 7 and the tacks are driven while the lugs are under tension.

The pane 6 is then pressed with its bevel face against the washer 7 and is forced outward by pressure upon the welt 9 until the glass contacts with the ring 5. By the compression produced by the tension upon the lugs and also by the compression of the washer on the pane, a water-tight joint is formed. The welt 9 furnishes a pliable support for the glass and is held in position by tacks 13.

The welt and washer afford a yielding seat for the glass which tends to prevent breakage of the glass by jolts and jars of the vehicle.

When the welt has been secured in place, the inner ends of the lugs 8, being too long, are clipped off flush with the inside of the frame, thus leaving a flush finish on the inside of the curtain.

We claim.

1. A curtain light comprising a frame to which curtains provided with an opening are attached at said opening, a concavo-convex ring provided with stays fixed to the concavity of the ring and projecting therefrom through the opening in the frame; and a gasket in the concavity; said concavity extending across the margin of the opening through the frame, and the stays being fixed to the frame to compress the gasket against the curtain and to hold one edge of the ring tightly against the curtain on the frame.

2. In a curtain light, a finish ring having an annular concavity, a compressible gasket in said concavity, and a stay fixed to the ring and projecting from said concavity for the purpose of attaching the ring to the frame for holding a pane.

3. The combination with a curtain light frame and a curtain thereof, of a ring having a concavity and adapted to fit upon the frame and to project across the margin of the orifice therein a gasket in the concavity, and stays fastened to the ring and to the frame for holding the ring in place.

4. The combination with a frame having an orifice therein, of a curtain to which the frame is attached; a ring provided with a concavity; a gasket in said concavity; stays projecting from the ring and fastened to the inside of the frame to compress the gasket against the curtain and to hold the ring tightly against the curtain to clamp the curtain against the ring.

5. The combination with a frame having an orifice therein, of a curtain to which the frame is attached; a hollow half round ring; stays projecting from the ring and fastened to the inside of the frame and holding the ring tightly against the curtain to clamp the curtain against the ring; a gasket compressed between the curtain and the ring and being in the hollow portion of said ring; a pane pressed against the gasket; a welt compressed against the pane; and means securing the welt inside the orifice of the frame.

In testimony whereof, we have hereunto set our hands at Los Angeles, California, this 19th day of October, 1920.

GEORGE WHOMES.
FRANCIS H. WHOMES.

Witness:
JAMES R. TOWNSEND.